United States Patent
Hatcher et al.

(10) Patent No.: US 10,878,317 B2
(45) Date of Patent: Dec. 29, 2020

(54) METHOD AND SYSTEM FOR PERFORMING ANALOG COMPLEX VECTOR-MATRIX MULTIPLICATION

(71) Applicant: Samsung Electronics Co., Ltd., Gyeonggi-do (KR)

(72) Inventors: Ryan M. Hatcher, Austin, TX (US); Jorge A. Kittl, Lakeway, TX (US); Borna J. Obradovic, Leander, TX (US); Titash Rakshit, Austin, TX (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 452 days.

(21) Appl. No.: 15/849,106

(22) Filed: Dec. 20, 2017

(65) Prior Publication Data

US 2019/0080230 A1    Mar. 14, 2019

Related U.S. Application Data (60) Provisional application No. 62/556,842, filed on Sep. 11, 2017.

(51) Int. Cl.
  *G06N 3/063*    (2006.01)
  *G06F 7/544*    (2006.01)
  *G06F 7/48*     (2006.01)

(52) U.S. Cl.
  CPC ......... *G06N 3/0635* (2013.01); *G06F 7/4806* (2013.01); *G06F 7/5443* (2013.01)

(58) Field of Classification Search
  CPC ... G06N 3/0635; G06F 7/5443; G06F 7/4806; G06F 2207/4814; G06F 7/523; G06F 17/16
  USPC .......................................... 708/835
  See application file for complete search history.

(56) References Cited

U.S. PATENT DOCUMENTS

| | | | |
|---|---|---|---|
| 8,183,554 B2 | 5/2012 | Mouttet | |
| 9,384,168 B2 | 7/2016 | Mortensen | |
| 9,646,243 B1 | 5/2017 | Gokmen | |
| 9,785,615 B1* | 10/2017 | Merced Grafals | G11C 13/0028 |
| 9,910,827 B2* | 3/2018 | Muralimanohar | G06F 17/16 |

(Continued)

OTHER PUBLICATIONS

Son Ngoc Truong and Kyeong-Sik Min, New Memristor-Based Crossbar Array Architecture with 50-% Area Reduction and 48-% Power Saving for Matrix-Vector Muitipiication of Analog Neuromorphic Computing, Journal of Semiconductor Technology and Science, vol. 14, No. 3, Jun. 2014.

*Primary Examiner* — Tan V Mai
(74) *Attorney, Agent, or Firm* — Van Pelt, Yi & James LLP (57) ABSTRACT

A hardware device and method for performing a multiply-accumulate operation are described. The device includes inputs lines, weight cells and output lines. The input lines receive input signals, each of which is has a magnitude and a phase and can represent a complex value. The weight cells couple the input lines with the output lines. Each of the weight cells has an electrical admittance corresponding to a weight. The electrical admittance is programmable and capable of being complex valued. The input lines, the weight cells and the output lines form a crossbar array. Each of the output lines provides an output signal. The output signal for an output line is a sum of an input signal for each of the input lines connected to the output line multiplied by the electrical admittance of each of the weight cells connecting the input lines to the output line.

19 Claims, 6 Drawing Sheets

(56) References Cited

U.S. PATENT DOCUMENTS

| | | | |
|---|---|---|---|
| 10,621,267 B2 * | 4/2020 | Strachan | G06F 17/141 |
| 2017/0220526 A1 * | 8/2017 | Buchanan | G11C 7/1006 |
| 2017/0228345 A1 * | 8/2017 | Gupta | G06F 17/16 |
| 2018/0253643 A1 * | 9/2018 | Buchanan | G06F 7/5443 |
| 2018/0321942 A1 * | 11/2018 | Yu | G11C 7/1006 |

* cited by examiner

METHOD AND SYSTEM FOR PERFORMING ANALOG COMPLEX VECTOR-MATRIX MULTIPLICATION

CROSS-REFERENCE TO RELATED APPLICATIONS

This application claims the benefit of provisional Patent Application Ser. No. 62/556,842, filed Sep. 11, 2017, entitled "COMPLEX ANALOG MATRIX-VECTOR MULTIPLICATION", assigned to the assignee of the present application, and incorporated herein by reference.

BACKGROUND

Vector-matrix multiplication operations, otherwise known as a multiply and accumulate (MAC) operations, dominate the performance of applications in a variety of fields. For example, in machine learning, multiple layers of MAC operations may be performed. Input signals may be considered to form the input vector. The input signals may be data for an image, a byte stream or another data set. The input signals are multiplied by a matrix of values, or weights. The outputs signals are the result of the MAC operations on the input signals and correspond to the output vector. The output vector may be provided as an input vector to the next layer of MAC operations. This process may be repeated for a large number of layers. Because a large number of MAC operations are carried out, the performance of the application is largely determined by the performance of the MAC operations. It is desirable, therefore, to carry out MAC operations efficiently, reliably, at low power and at high speed.

MAC operations may be performed digitally. However, analog crossbar arrays may carry out MAC operations more efficiently than digital circuits. Such analog crossbar arrays utilize DC signals and a resistor at each crosspoint. The conductance of each resistor corresponds to the weight of the matrix at that position. The multiplication and accumulation are performed by setting the potential on the input lines proportional to the desired input values, $V_i \propto a_i$, where $V_i$ is the potential and $a_i$ is the desired input value. The resistances in the crossbar network are set proportional to the inverse of the weights. Thus, $w_{ij} \propto 1/R_{ij}$, where $w_{ij}$ is the desired weight and $R_{ij}$ is the desired resistance for the crosspoint. The MAC output is then proportional to the current on the output lines: $b_j \propto i_j$, where $b_j$ is the output and $i_j$ is the current on the output line. An activation function is applied to the MAC output, which is converted back to a voltage. This voltage is the output vector corresponding to the product of the input vector and the array of weights representing the matrix. Consequently, a vector-matrix multiplication for real inputs and weights may be performed in analog.

Because of their potential for use in a variety of fields, what is desired is faster, more flexible and more power efficient dedicated hardware implementations for vector-matrix multiplication.

BRIEF SUMMARY OF THE INVENTION

A hardware device and method for performing a multiply-accumulate operation are described. The device includes inputs lines, weight cells and output lines. The input lines receive input signals, each of which is an AC analog harmonic signal that has a magnitude and a phase. The input signals are thus capable of representing a complex value. The weight cells couple the input lines with the output lines. Each of the weight cells has an electrical admittance corresponding to a weight. The electrical admittance is programmable and capable of being complex valued. The input lines, the weight cells and the output lines form a crossbar array. Each of the output lines provides an output signal. The output signal for an output line is a sum of an input signal for each of the input lines connected to the output line multiplied by the electrical admittance of each of a portion of the plurality of weight cells connecting the input lines to the output line.

The hardware device can perform vector-matrix multiplications for a complex signal (complex valued input vector) and employing complex weights (complex valued matrix). As a result, the speed, flexibility and/or efficiency of such MAC operations may be improved.

DETAILED DESCRIPTION OF THE INVENTION

The exemplary embodiments relate to hardware devices for performing multiply-accumulate (MAC) operations, also termed vector-matrix multiplication operations. The method and system described herein may be used in a variety of fields including but not limited to machine learning, artificial intelligence and neural networks. The method and system further relate to the use of complex valued signals and/or weights which may be useful in optimizing neural networks or for other applications. The method and system may be extended to other applications in which complex signals (e.g. complex vectors) and/or complex weights (complex valued matrices) are used.

The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations.

Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or fewer components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

A hardware device and method for performing a multiply-accumulate operation are described. The device includes inputs lines, weight cells and output lines. The input lines receive input signals, each of which is an AC analog harmonic signal that has a magnitude and a phase and is capable of representing a complex value. The weight cells couple the input lines with the output lines. Each of the weight cells has an electrical admittance corresponding to a weight. The electrical admittance is programmable and capable of being complex valued. The input lines, the weight cells and the output lines form a crossbar array. Each of the output lines provides an output signal. The output signal for an output line is a sum of an input signal for each of the input lines connected to the output line multiplied by the electrical admittance of each of the weight cells connecting the input lines to the output line.

Figure 1:
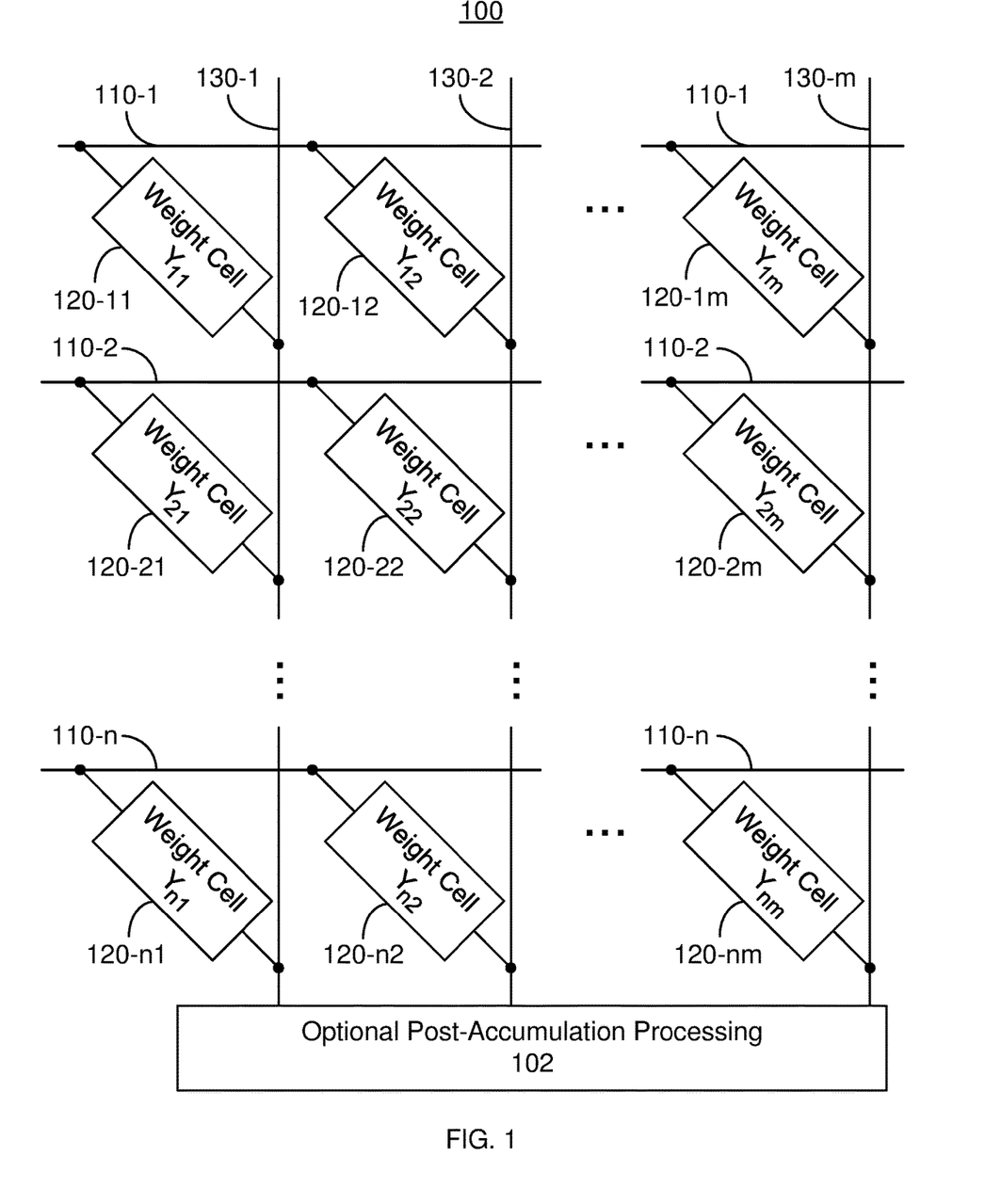
FIG. 1 depicts a portion of an exemplary embodiment of a hardware crossbar array capable of performing an analog complex valued MAC operation.

FIG. 1 depicts a portion of an exemplary embodiment of a hardware device 100 capable of performing an analog complex valued multiply-accumulate (MAC) operation/vector-matrix multiplication. For simplicity, only a portion of the hardware device 100 is shown. The hardware device 100 may be a hybrid analog-digital circuit. The hardware device 100 includes input lines 110-1 through 110-n (collectively/generically referred to as input lines 110), weight cells 120-11 through 120-nm (collectively/generically referred to as weight cells 120), output lines 130-1 through 130-m (collectively/generically referred to as output lines 130) and optional post-accumulation block 102. In some embodiments, each input line 110 may be considered a pre-synaptic line, each weight cell 120 a synapse and each output line 130 a post-synaptic line. The input lines 110 are connected to the output lines 130 through the array of weight cells 120. For example, input line 110-1 is connected to output line 130-1 through weight cell 120-11, to output line 130-2 through weight cell 120-12, . . . and to output line 130-m through weight cell 120-1m. Consequently, the input lines 110, weight cells 120 and output lines 130 form a crossbar array.

The input lines 130 receive input signals that are complex valued. Each input signal is an AC analog harmonic signal. This AC analog harmonic signal uses the magnitude and phase to represent a complex value. For example, the input signal to input line 110-$i$ may be a voltage given by: $V_i e^{j\omega t}$, where t is time, $\omega$ is the frequency, and $V_i$ is the potential. The input signal might also be represented as: $V_{i,re}$ cos $\omega t + j V_{i,im}$ sin $\omega t$. $V_{i,re}$ and $V_{i,im}$ are the magnitudes of the real and imaginary portions of $V_i$. $V_{i,re}$ or $V_{i,im}$ may be zero for at least some of the input lines 110. The input signals provided to the input lines 130 correspond to the vector in a matrix-vector multiplication operation. Stated differently, the magnitudes of the voltage signals provided to input lines 130 are proportional to the desired input values for the input vector. This input vector may be the output of a previous MAC operation that may be performed by a device (not shown) that may be analogous to the hardware device 100.

Each of the weight cells 120 has an electrical admittance, $Y_{ij}$, where i corresponds to the input line number and j corresponds to the output line number of the crosspoint. The electrical admittance is programmable, capable of being complex valued and is the weight of the weight cell 120. The admittance of a given weight cell 120 may take on purely real values, purely imaginary values, or can be the sum of real and imaginary values. To provide this admittance, the weight cells 120 may include passive electronic components, such as resistors and capacitors. For example, a weight cell 120 may include a resistor in parallel with a capacitor. For such a weight cell, the admittance $Y_{ij}=G_{ij}+iC_{ij}$, where $G_{ij}=1/R_{ij}$, $G_{ij}$ is the conductance of the resistor, $R_{ij}$ is the resistance of the resistor, and $C_{ij}$ is the capacitance of the capacitor. In other embodiments, other or additional passive components having complex admittances may be used. The array of weight cells 120 corresponds to the matrix for the vector-matrix multiplication. The admittance $Y_{ij}$ of weight cell 120-$ij$ is proportional to the value in the ijth position of the matrix being multiplied with the input vector.

Each of the output lines 130 provides an output signal in the form of a current. Because of the manner in which the input lines 110, weight cells 120 and output lines 130 are connected, the output signal for each output line is a sum of the input signal for each of the input lines 110 connected to the output line multiplied by the electrical admittance of each weight cell 120 connecting the input lines 110 to the output line 130. Thus, output signal for each output line 130 is a complex current that is given by: $I_j = \Sigma_i V_i Y_{ij}$.

Post accumulation processing block 102 may be used to perform additional processing on the output signals. For example, the post processing block may convert the currents in the output lines 130 to voltages. Such voltages may form the input signals for a subsequent hardware MAC operation device (not shown) that may be analogous to the hardware device 100. In an alternate embodiment, post accumulation processing block 102 may be omitted.

In operation, the admittances of each of the weight cells 120 are programmed. A sinusoidal complex voltage signal corresponding to the input vector is driven through each of the input lines 110. The resulting current through output line 130 depends on the voltage through each input line and the admittance of the weight cells 120 connecting the input lines 110 with the output line. The current on the $j^{th}$ output line 130 is given by: $I_j = \Sigma_i V_i Y_{ij} = \Sigma_i V_i(G_{ij}+C_{ij})$, where i corresponds to the input lines 110 and ranges from 1 through n and each weight cell 120 includes a capacitor in parallel with a resistor. This current may be converted into a voltage or otherwise manipulated by the post processing block 102. Because analog signals are used, a latency penalty due to the number of cycles required to stabilize the output may be incurred for the hardware device 100. In addition, sufficient nonlinearities in the resistors or capacitors within the weight cells 120 may lead to distortion and error in the output. During operation of the hardware device 100, such nonlinearities are desired to be reduced and a sufficient number of cycles for stabilization of the output are desired to be carried out.

Using the hardware device 100, a MAC operation/vector-matrix multiplication can be carried out for complex valued analog signals and using complex valued weights. Because it is implemented in hardware, the analog hardware device 100 may perform MAC operations with lower power consumption and improved performance. The weights/electrical admittances for a particular weight cell 120 of the hardware device 100 may be purely real, purely imaginary, or include both real and imaginary components. The hardware device 100 may thus have increased flexibility as compared to a conventional hardware implementation employing only real weights. The hardware device 100 may be utilized to efficiently perform complex MAC operations in neural networks using complex values. Such complex valued neural networks may solve problems with fewer neurons and/or mathematical operations. Thus, neural network design may be improved, performance enhanced and power consumption reduced. Similar benefits may be achieved in other applications utilizing complex-valued MAC operations. The hardware device 100 may thus be capable of improving performance of applications relying on MAC operations.

Figure 2:
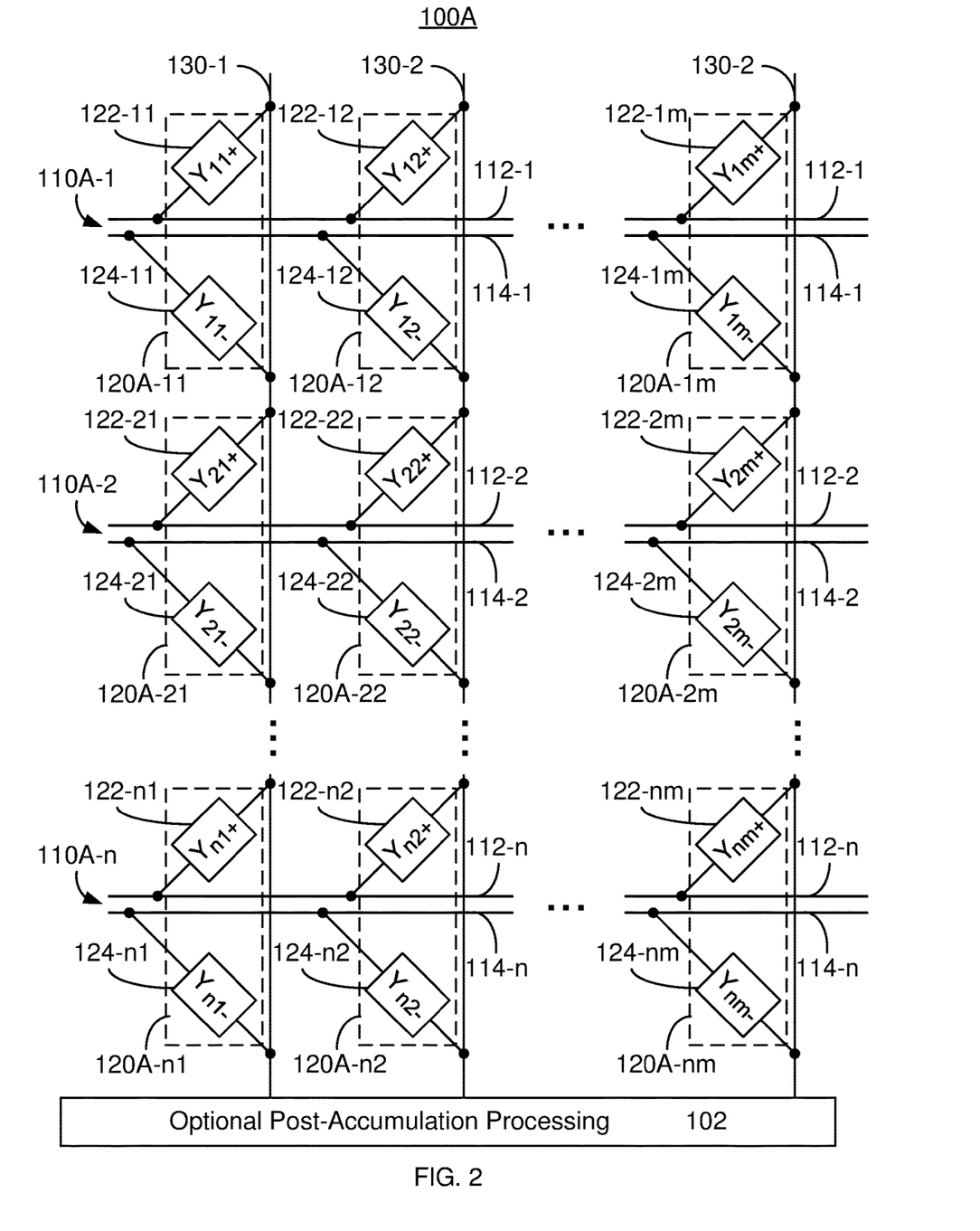
FIG. 2 depicts an exemplary embodiment of a portion of a hardware crossbar array capable of performing an analog complex valued MAC operation incorporating negative weights.
Figure 3:
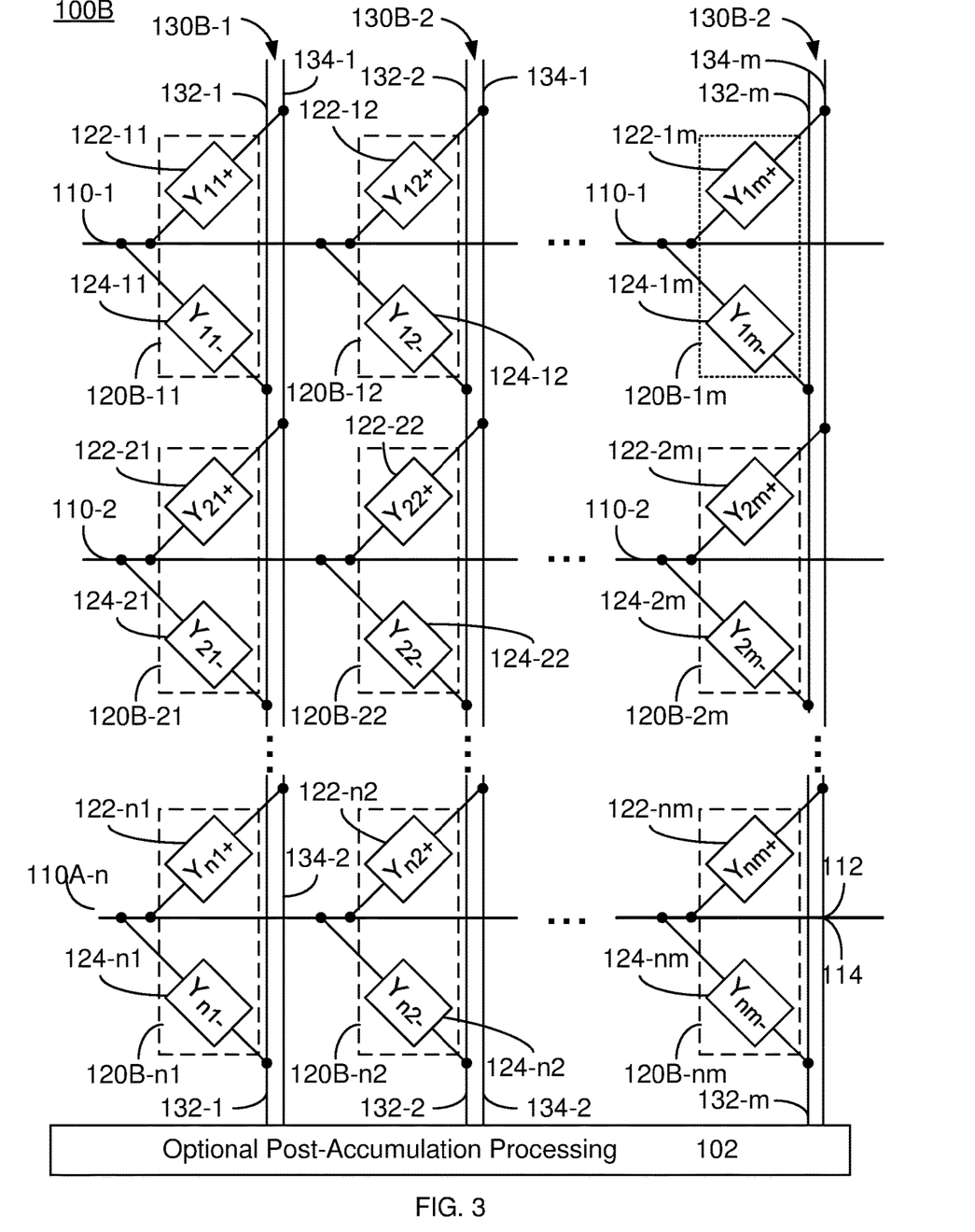
FIG. 3 depicts an exemplary embodiment of a portion of a hardware crossbar array capable of performing an analog complex valued MAC operation incorporating negative weights.
Figure 4:
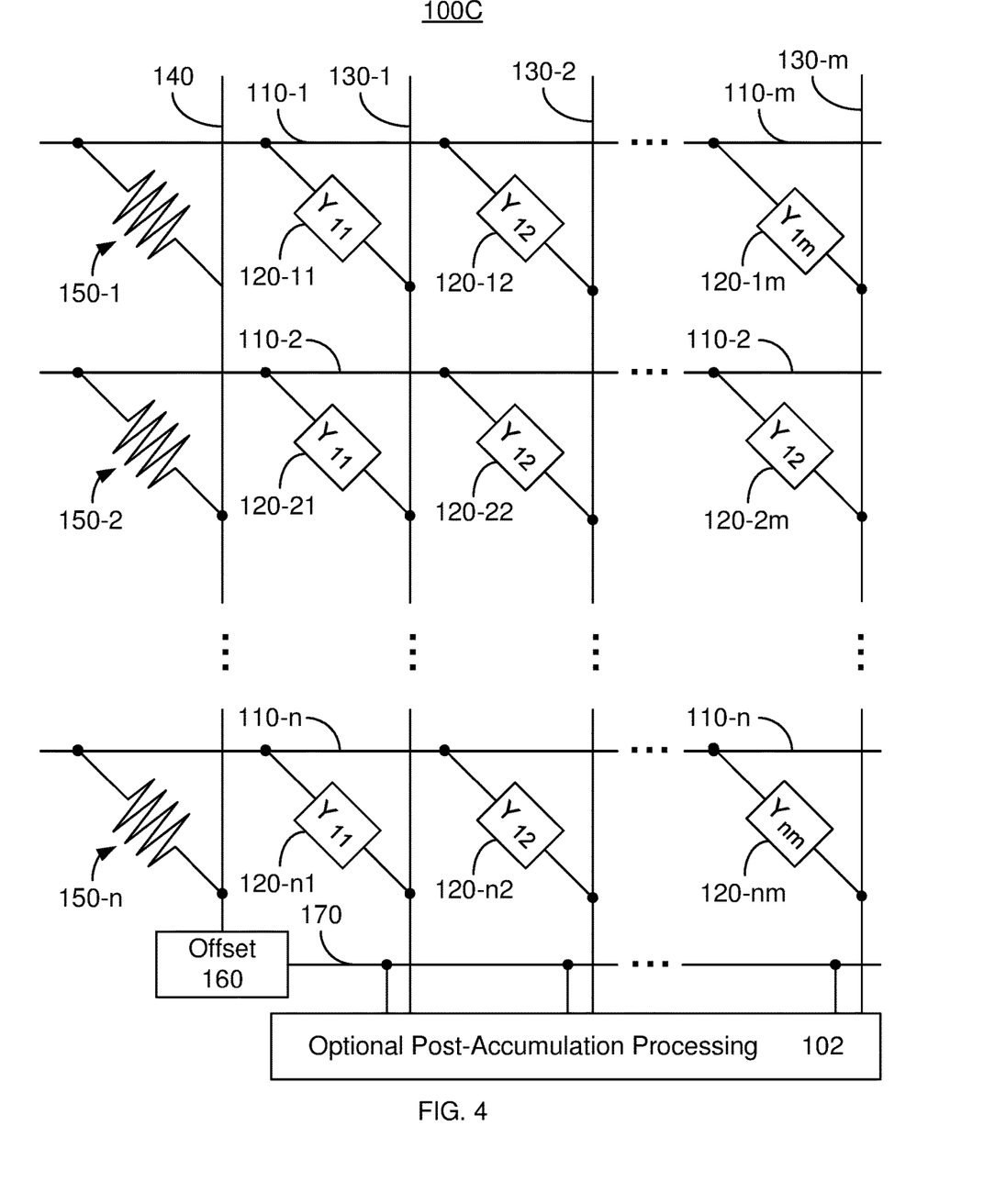
FIG. 4 depicts an exemplary embodiment of a portion of a hardware crossbar array capable of performing an analog complex valued MAC operation incorporating negative weights.

In the hardware device 100 shown in FIG. 1, the admittances of the weight cells 120 may only have positive values if only passive components are used. This is because passive components such as resistances, capacitances discussed in detail herein have non-negative admittances. However, it may be desirable for the weights for the weight cells 120 to take on general complex values (either positive or negative). FIGS. 2-4 depict exemplary embodiments of hardware device in which the weights may be positive or negative complex values and implemented using passive components. In alternate embodiments, active elements, such as current mirrors, may be employed within the weight cells 120 to provide positive and negative complex valued weights.

FIG. 2 depicts an exemplary embodiment of a portion of a hardware device 100A capable of performing an analog complex valued MAC operation incorporating negative weights. The hardware device 100A is analogous to the hardware device 100. The hardware device 100A thus includes input lines 110A, weight cells 120A, output lines 130 and optional post-accumulation block 102 that correspond to input lines 110, weight cells 120, output lines 130 and optional post-accumulation block 102, respectively. Thus, the input lines 110A, weight cells 120A and output lines 130 are indexed in a manner analogous to that described above. However, as can be seen in FIG. 2, each input line 110A-i includes two input sub-lines 112-i and 114-i (generically sub-lines 112 and 114). For example, input line 110A-1 includes sub-lines 112-1 and 114-1. Each weight cell 120A-ij includes two weight sub-cells 122-ij and 124-ij. For example, weight cell 120A-11 includes sub-cells 122-11 and 124-11.

The input lines 110A include sub-lines 112 and 114 in order to carry positive and negative input signals, respectively. Similarly, the weight cells 120A-ij include a positive sub-cell 122-ij (generically sub-cell 122) connected to the positive sub-line 112 and a negative sub-cell 124-ij (generically sub-cell 124) connected to the negative sub-line 114. The positive sub-cell 122 has an admittance $Y_{ij+}$, while the negative sub-cell 124 has admittance $Y_{ij-}$. Both sub-cells 122 and 124 are connected to the corresponding output line 130. Thus, the positive and negative complex input values (voltages) are multiplied by the desired weights (admittances) and both accumulated on the appropriate output line 130. The output of the MAC operation performed by the hardware device 100A is the current carried on each output line 130.

The hardware device 100A operates in an analogous manner to the hardware device 100. The admittances of each of the weight cells 120A are set. In addition, sinusoidal complex voltages for the positive and negative weights are driven through each of the input lines 112 and 114. The resulting current through output line 130 depends on the voltage through each input line 112 and 114 and the admittances of the sub-cells 122 and 124, respectively. The current on the $j^{th}$ output line 130 is given by: $I_j = \Sigma_i V_i(Y_{ij+} - Y_{ij-})$, where i corresponds to the input lines 110A and ranges from 1 through n. This current may be converted into a voltage by the post processing block 102 and provided to a subsequent hardware device that performs a subsequent MAC operation.

Using the hardware device 100A, the benefits of the hardware device 100 may be achieved. Thus, a MAC operation/vector-matrix multiplication can be carried out using analog signals and complex weights with lower power consumption and improved performance. The hardware device 100A may thus have increased flexibility and may be utilized to efficiently perform complex MAC operations in neural networks using complex values. The hardware device 100A may also be extended to other applications in which complex values might be desired. The hardware device 100A may thus be capable of improving performance of applications relying on MAC operations. Further, the weights used in the MAC operation may take on positive and negative complex values. Consequently, utility of the hardware device 100A may be extended.

FIG. 3 depicts an exemplary embodiment of a portion of a hardware device 100B capable of performing an analog complex valued MAC operation incorporating negative weights. The hardware device 100B is analogous to the hardware device(s) 100 and 100A. The hardware device 100B thus includes input lines 110, weight cells 120B, output lines 130B and optional post-accumulation block 102 that correspond to input lines 110/110A, weight cells 120/120A, output lines 130 and optional post-accumulation block 102, respectively. Thus, the input lines 110, weight cells 120B and output lines 130 are indexed in a manner analogous to that described above. As can be seen in FIG. 3, each output line 130B-i includes two output sub-lines 132-i and 134-l (generically line 132 and 134). For example, output line 130B-1 includes sub-lines 132-1 and 134-1. Further, each weight cell 120B-ij includes two weight sub-cells 122-ij and 124-ij.

The weight cells 120B-ij include a positive sub-cell 122-ij (generically sub-cell 122) and a negative sub-cell 122-ij (generically sub-cell 124) both of which are connected to the input line 110. The positive sub-cell 122 is connected to the positive output sub-line 132. Negative sub-cell 124 connected to the negative output sub-line 134. The positive sub-cell 122 has an admittance $Y_{ij+}$, while the negative sub-cell 124 has admittance $Y_{ij-}$. Thus, the complex input values (voltage) multiplied by the desired weights (admittances) are both accumulated on the appropriate positive output line 132 and negative output line 134. Output lines 1308 thus carry positive and negatively weighted output signals on sub-lines 132 and 324, respectively.

The hardware device 100B operates in an analogous manner to the hardware devices 100 and 100A. The admittances of each of the weight cells 120B are set. In addition, sinusoidal complex voltage is driven through each of the input lines 110. The resulting current through each output sub-line 132 and 134 depends on the voltage through the input line 110 and the admittance of the weight corresponding sub-cells 122 and 124, respectively. The currents on the $j^{th}$ output sub-line 132-$j$ and 134-$j$ is given by: $I_{j+}=\Sigma_i V_i Y_{ij+}$ and $I_{j-}=\Sigma_i V_i Y_{ij-}$, respectively, where i corresponds to the input lines 110A and ranges from 1 through n. This current may be converted into a voltage by the post processing block 102 and provided to a subsequent hardware device that performs a subsequent MAC operation.

Using the hardware device 100B, the benefits of the hardware device(s) 100 and/or 100A may be achieved. Thus, a MAC operation/vector-matrix multiplication can be carried out using analog signals and complex weights with lower power consumption and improved performance. The hardware device 100A may thus have increased flexibility and may be utilized to efficiently perform complex MAC operations in neural networks using complex values. The hardware device 100A may also be extended to other applications in which complex values might be desired. The hardware device 100B may thus be capable of improving performance of applications relying on MAC operations. Further, the weights used in the MAC operation may take on positive and negative complex values. Consequently, utility of the hardware device 100 may be extended.

Although the hardware devices 100A and 100B function, these devices require significant additional circuitry. More specifically, an additional input or output line and multiple sub-cells are required for each weight cell. Consequently, an improved mechanism for performing MAC operations capable of using positive and negative complex weights may be desired.

FIG. 4 depicts an exemplary embodiment of a portion of a hardware device 100C capable of performing an analog complex valued MAC operation incorporating negative weights without requiring additional sub-cells and input or output lines per weight cell. The hardware device 100C is analogous to the hardware device(s) 100, 100A and 100B. The hardware device 100C thus includes input lines 110, weight cells 120, output lines 130 and optional post-accumulation block 102 that correspond to input lines 110, weight cells 120, output lines 130 and optional post-accumulation block 102, respectively. The input lines 110, weight cells 120 and output lines 130 are indexed in a manner analogous to that described above. In addition, offset resistors 150-$i$ (generically 150) having resistances of $R_{off-i}$ for each input line 110 are present. The hardware device 100C also includes an additional offset line 140, optional offset block 160 that may process the output current from offset line 140 and optional offset voltage line 170.

It can be shown that a negative complex valued weight, such as the admittance $Y_{ij-}$, may be represented by a fixed value to offset the total admittance for the input 110-$i$. This offset need not be included in each individual weight cell 120-$ij$. Instead, the offset may be represented by the resistor 150-$i$ having resistance $R_{off-i}$ for each input line 110-$i$. The sum of the conductance corresponding to these offset resistances multiplied by the input voltages may be accumulated on a separate offset line 140 and incorporated with the outputs on the remaining lines. The offset block 160 may convert the offset current to a voltage. Optional voltage line 170 may provide the offset voltage with each output line 130. In an alternate embodiment, the conversion to a voltage may be performed by post-accumulation block 102.

The hardware device 100C operates in an analogous manner to the hardware devices 100, 100A and 100C. The admittances of each of the weight cells 120 are set. In addition, sinusoidal complex voltage is driven through each of the input lines 110. The resulting current through each output line 130 is accumulated in an analogous manner to that described for the hardware device 100. In addition, admittances $1/R_{off-i}$ for the resistors 150-$l$ connected to offset line 140 result in accumulated offset current $I_{off}$. The offset current on the offset line 140 is given by: $I_{off}=\Sigma_i V_i / R_{off-i}$, where i corresponds to the input lines 110 and ranges from 1 through n. This offset current may be subtracted from the output currents on output lines 130. The resulting current for each output line 130 may be converted into a voltage by the post processing block 102 and provided to a subsequent hardware device that performs a subsequent MAC operation. Alternatively, the offset current may be converted to an offset voltage and subtracted from the voltages corresponding to the currents in the offset lines 130.

Using the hardware device 100C, the benefits of the hardware device(s) 100, 100A and/or 100B may be achieved. Thus, a MAC operation/vector-matrix multiplication can be carried out using analog signals and complex weights with lower power consumption and improved performance. The hardware device 100C may thus have increased flexibility and may be utilized to efficiently perform complex MAC operations in neural networks using complex values. The hardware device 100C may also be extended to other applications in which complex values might be desired. The hardware device 100C may thus be capable of improving performance of applications relying on MAC operations. The weights used in the MAC operation may take on positive and negative complex values. Moreover, negative complex values may be incorporated in a simpler, more efficient and elegant circuit. Consequently, utility of the hardware device(s) 100, 100A and/or 100B may be extended.

Figure 5A:
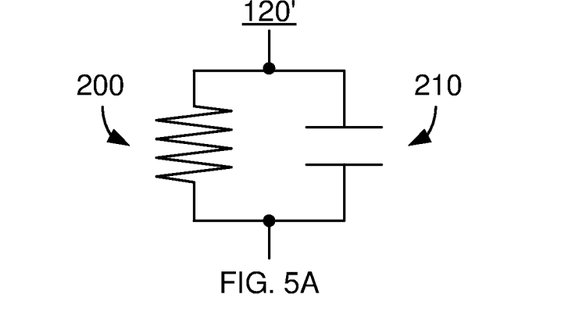
FIGS. 5A, 5B and 5C depict exemplary embodiments of a weight cell, a programmable resistor and programmable capacitor that may be used in a hardware crossbar array that performs analog complex valued MAC operations.
Figure 5B:
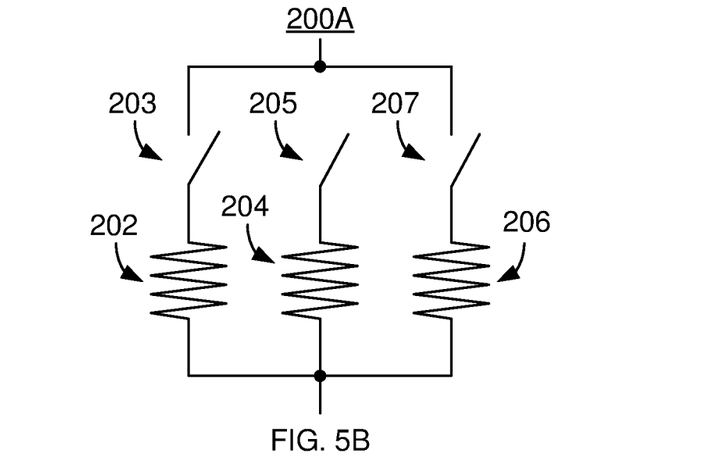
Figure 5C:
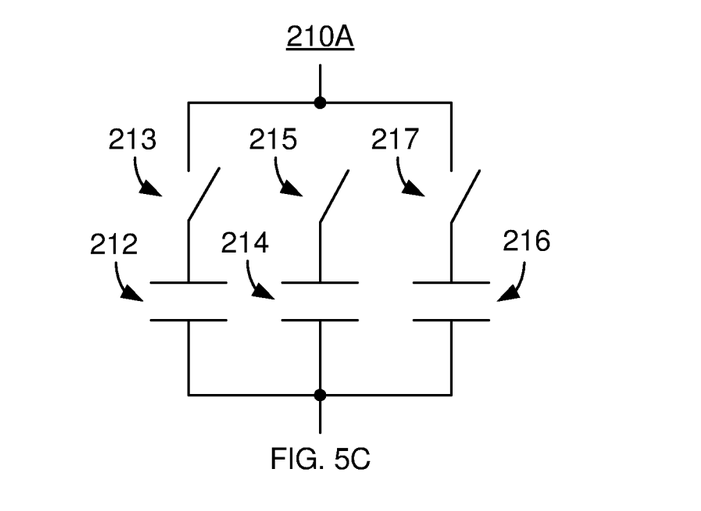

FIGS. 5A, 5B and 5C depict exemplary embodiments of a weight cell 120', a programmable resistance circuit 200A and programmable capacitance circuit 210A, respectively. Referring to FIG. 5A, the weight cell 120' may be used in one or more of the weight cells 120, 120A and/or 120B in the hardware device(s) 100, 100A, 100B and/or 100C. The weight cell 120' includes a programmable resistor 200 in parallel with a programmable capacitor 210. In some embodiments, switches (not shown) are in series with the resistor 200 and capacitor 210. In the embodiment shown, however, such switches are omitted. The programmable resistor 200 has a variable conductance of $G_p$. The programmable capacitor 210 has a programmable capacitance, $C_p$. The programmable admittance of the weight cell 120' is $G_p+C_p$. The weight cell 120' can thus be purely resistive, can be purely capacitive or both resistive and capacitive.

FIG. 5B depicts one embodiment of the programmable resistance circuit 200A that may be used for the programmable resistor 200. The programmable resistance circuit 200A includes resistors 202, 204 and 206 and switches 203, 205 and 207, respectively, connected in parallel. The resistors 202, 204 and 206 have conductances $G_1$, $G_2$ and $G_3$, respectively. In the exemplary embodiment, each switch 203, 207 and/or 207 is a flash transistor. However, the switches 203, 205 and/or 207 may include other device(s) that have a sufficiently large on/off ratio. For example, the on/off ratio may be at least $10^5$. Such devices may include but are not limited to MOSFETs, ferroelectric transistors, and/or resistive random access memory (RRAM) elements. The resistors 200 and 200A may be implemented in a number of manners. For example, magnetic random access memory (MRAM) elements such as magnetic tunneling junctions, flash devices, RRAM elements, phase change memory (PCM) elements, ferroelectric random access memory (FeRAM) elements and/or analogous device(s) can be used to construct resistors 202, 204 and/or 206. In some embodiments, $G_2$ is twice $G_1$ and $G_3$ is twice G2. By selectively opening or closing the switches 203, 205 and 207, the resistance of the programmable resistance circuit 200A can be set to one of eight evenly distributed values. However, other configurations having other resistance values are possible.

FIG. 5C depicts one embodiment of the programmable capacitance circuit 210A that may be used for the programmable capacitor 210 of the weight cell 120'. The programmable capacitance circuit 210A includes capacitors 212, 214 and 216 and switches 213, 215 and 217, respectively, that are connected in parallel. The capacitors 212, 214 and 216 have capacitances $C_1$, $C_2$ and $C_3$, respectively. In the exemplary embodiment, each switch 213, 217 and/or 217 is a flash transistor. However, the switches 213, 215 and/or 217 may include other device(s) having a sufficiently large on/off ratio. Such an off/off ratio may be at least $10^5$. Devices meeting this criterion may include those described above. Additional devices that may serve as programmable capacitors 210/210A include ferroelectirc FETs (FeFETS), flash devices, MOS capacitors (MOSCAPs) or analogous devices having complex impedances. However, such alternative devices may have relatively nonlinear current-voltage characteristics, which may lead to distortion and inaccuracy in the MAC operation. Consequently, such devices may not be desired to be used in at least some embodiments. In an alternate embodiment, the programmable capacitors 210/210A may be augmented or replaced by programmable inductors. However, compact programmable and manufacturable inductor devices may be difficult to obtain. In some embodiments, $C_2$ is twice $C_1$ and $C_3$ is twice C2. However, other configurations are possible. By selectively opening or closing the switches 213, 215 and 217, the capacitance of the programmable capacitor 210A can be set to one of eight evenly distributed values. However, other configurations having other capacitance values are possible.

Using the weight cell 120', the programmable resistance circuit 200A and/or the programmable capacitance circuit 210A, the hardware device 100, 100A, 100B, 100C and/or an analogous device may be implemented. Other implementations may be used in other embodiments. Consequently, the benefits of the hardware device 100, 100A, 100B and/or 100C may be realized.

Figure 6:
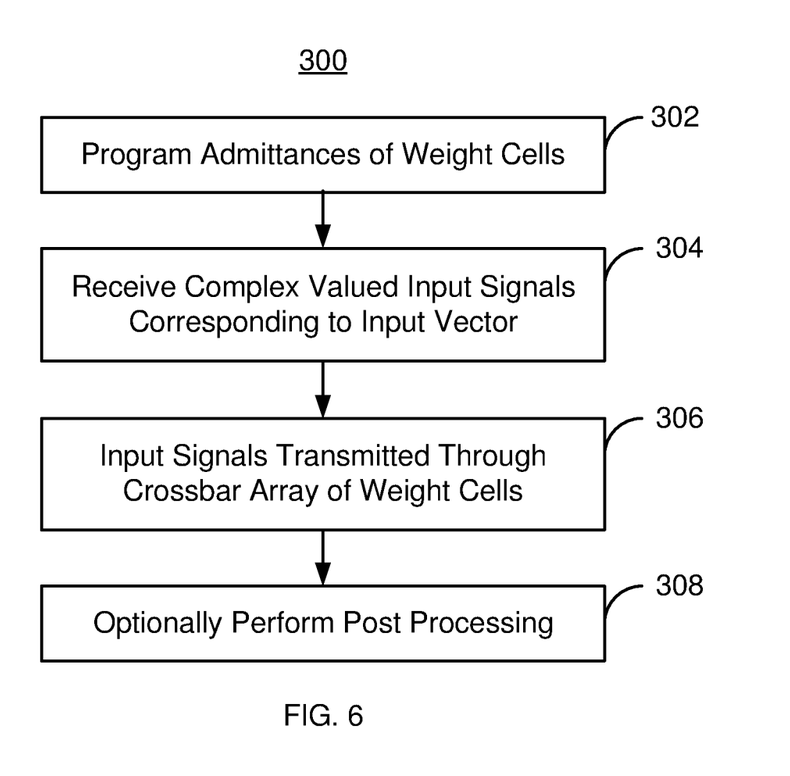
FIG. 6 is a flow chart depicting an exemplary embodiment of a method for performing an analog complex valued MAC operation.

FIG. 6 is a flow chart depicting an exemplary embodiment of a method 300 for performing an analog complex valued MAC operation. For simplicity, some steps may be omitted, performed in another order and/or combined. The method 300 is also described in the context of the hardware device 100. However, the method 300 may be used in connection with another hardware device for performing analog complex valued MAC operations, such as the device(s) 100A, 100B and/or 100C.

The admittances for the weight cells 120 are programmed, via step 302. Thus, the desired resistances, capacitances, inductances and/or other electrical characteristics of the weight cells 120 are set. Step 302 may include opening or closing one or more of the switches 203, 205, 207, 213, 215 and/or 217 to provide the desired resistance and capacitance in each weight cell 120.

The input signals are received, via step 304. Step 304 may include generating the input signals for each of the input lines 110 and receiving the signals. Thus, a complex, AC harmonic voltage signal may be provided to the hardware device.

The input signals are passed through the crossbar array of the hardware device 100, via step 306. Because of the configuration of the input lines 110, weight cells 120 and output lines 130, a MAC operation is performed on the input signals. The resulting currents on the output lines 130 are, therefore, the output of the MAC operation.

The currents on the output lines 130 may be processed by post-accumulation block 102, via step 308. For example, the currents on the output lines 130 may be translated to voltages. Thus, an output vector resulting from the multiplication of the input vector on the input lines 110 and the matrix formed by the weight cells 120 may be provided.

Thus, using the method 300, the hardware devices 100, 100A, 100B, 100C and/or an analogous device may be used. As a result, the advantages of one or more the hardware devices 100, 100A, 100B and/or 100C may be achieved.

A method and system for performing a MAC operation/vector-matrix multiplication utilizing complex values been described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

We claim:
1. A hardware device for performing a multiply-accumulate operation comprising:
a plurality of input lines for receiving a plurality of input signals, each of the plurality of input signals being an AC analog harmonic signal having a magnitude and a phase, the AC analog harmonic signal being capable of representing a complex value;
a plurality of output lines; and
a plurality of weight cells coupling the plurality of input lines with the plurality of output lines, each of the plurality of weight cells having an electrical admittance corresponding to a weight, the electrical admittance of each of the plurality of weight cells being programmable and capable of being complex valued;
wherein the plurality of input lines, the plurality of weight cells and the plurality of output lines form a crossbar array;
wherein each of the plurality of output lines provides an output signal, the output signal for an output line of the plurality of output lines being a sum of an input signal for each of the plurality of input lines connected to the output line multiplied by the electrical admittance of each of a portion of the plurality of weight cells connecting the plurality of input lines to the output line.
2. The hardware device of claim 1 wherein each of the plurality of input lines is coupled to each of the plurality of output lines by a weight cell of the plurality of weight cells.

3. The hardware device of claim 2 wherein each of the plurality of weight cells includes a programmable resistor connected in parallel with a programmable capacitor.

4. The hardware device of claim 3 wherein the programmable resistor includes a plurality of resistive circuits connected in parallel, each resistive circuit including a switch connected in series with a resistor.

5. The hardware device of claim 3 wherein the programmable capacitor includes a plurality of capacitors connected in series with a switch.

6. The hardware device of claim 1 wherein the at least one weight of at least one of the plurality of weight cells can take on a negative complex value.

7. The hardware device of claim 6 wherein each of the at least one weight cell includes a positive weight sub-cell and a negative weight sub-cell and wherein each weight cell is coupled with two input lines of the plurality of input lines.

8. The hardware device of claim 6 wherein each of the at least one weight cell includes a positive weight sub-cell and a negative weight sub-cell and wherein each weight cell is coupled with two output lines of the plurality of output lines.

9. The hardware device of claim 6 further comprising:
an offset line connected to each of the plurality of inputs by a passive offset component having a real offset impedance and connected to each of the plurality of output lines.

10. A complex valued neural network comprising:
a plurality of layers of hardware devices, each of the hardware devices for performing a multiply-accumulate operation for an input vector with a matrix, each of the hardware devices including
a plurality of input lines for receiving a plurality of input signals corresponding to the input vector, each of the plurality of input signals being an AC analog harmonic signal having a magnitude and a phase, the AC analog harmonic signal being capable of representing a complex value;
a plurality of output lines coupled with the plurality of input lines; and
a plurality of weight cells coupling each of the plurality of input lines with each of the plurality of output lines to form a crossbar array, the plurality of weight cells corresponding to the matrix, each of the plurality of weight cells having an electrical admittance corresponding to a weight, the electrical admittance of each of the plurality of weight cells being programmable and capable of being complex valued, each of the plurality of weight cells including a programmable resistor connected in parallel with a programmable capacitor, the programmable resistor including a plurality of resistive circuits connected in parallel, each resistive circuit including a switch connected in series with a resistor, the programmable capacitor including a plurality of capacitors connected in series with a switch; and
an offset line connected to each of the plurality of inputs by a passive offset component having a real offset impedance and connected to each of the plurality of output lines such that each of the plurality of weights can take on a negative complex value;
wherein each of the plurality of output lines provides an output signal, the output signal for an output line of the plurality of output lines being a sum of an input signal for each of the plurality of input lines connected to the output line multiplied by the electrical admittance of each of a portion of the plurality of weight cells connecting the plurality of input lines to the output line; and
for each of the plurality of layers except the last layer, the output signal for each of the plurality of output lines corresponding to a component of the vector input for a next layer of hardware devices of the plurality of layers of hardware devices.

11. A method for performing a multiply-accumulate operation comprising:
receiving a plurality of input signals, each of the plurality of input signals being an AC analog harmonic signal having a magnitude and a phase, the AC analog harmonic signal being capable of representing a complex value;
passing the plurality of input signals through a crossbar array including a plurality of input lines, a plurality of output lines and a plurality of weight cells, the plurality of weight cells coupling the plurality of input lines with the plurality of output lines, each of the plurality of weight cells having an electrical admittance corresponding to a weight, the electrical admittance of each of the plurality of weight cells being programmable and capable of being complex valued such that each of the plurality of output lines provides an output signal, the output signal for an output line of the plurality of output lines being a sum of an input signal for each of the plurality of input lines connected to the output line multiplied by the electrical admittance of each of a portion of the plurality of weight cells connecting the plurality of input lines to the output line.

12. The method of claim 11 further comprising:
setting the electrical admittance of each of the plurality of weight cells before step of passing the plurality of input signal through the crossbar array.

13. The method of claim 12 wherein each of the plurality of weight cells includes a programmable resistor connected in parallel with a programmable capacitor, the method including:
setting a resistance for the programmable resistor in each of the plurality of weight cells; and
setting a capacitance for the programmable capacitor in each of the plurality of weight cells.

14. The method of claim 13 wherein the programmable resistor includes a plurality of resistive circuits connected in parallel, each resistive circuit including a switch connected in series with a resistor, the method further including:
setting the switch in each of the plurality of resistive circuits to one of a closed state and an open state.

15. The method of claim 13 wherein the programmable capacitor includes a plurality of capacitors connected in series with a switch, the method further including:
setting the switch in each of the plurality of resistive circuits to one of a closed state and an open state.

16. The method of claim 11 wherein the at least one weight of at least one of the plurality of weight cells can take on a negative complex value.

17. The method of claim 16 wherein each of the at least one weight cell includes a positive weight sub-cell and a negative weight sub-cell and wherein each weight cell is coupled with two input lines of the plurality of input lines.

18. The method of claim 16 wherein each of the at least one weight cell includes a positive weight sub-cell and a negative weight sub-cell and wherein each weight cell is coupled with two output lines of the plurality of output lines.

19. The method of claim 16 wherein the crossbar array further includes an offset line connected to each of the plurality of inputs by a passive offset component having a real offset impedance and connected to each of the plurality of output lines.

\* \* \* \* \*